United States Patent [19]
Gulick

[11] Patent Number: 5,958,027
[45] Date of Patent: Sep. 28, 1999

[54] METHOD AND SYSTEM FOR OPTIMIZING THE FLOW OF ISOCHRONOUS DATA AND CLOCK RATE INFORMATION

[75] Inventor: Dale E. Gulick, Austin, Tex.

[73] Assignee: Advanced Micro Devices, Inc., Sunnyvale, Calif.

[21] Appl. No.: 08/906,329

[22] Filed: Aug. 5, 1997

[51] Int. Cl.[6] .................................................. G06F 13/00
[52] U.S. Cl. ........................ 710/52; 710/63; 710/72; 710/101; 710/129
[58] Field of Search ........................... 710/52–57, 62–66, 710/72, 101–103, 129–130

[56] References Cited

U.S. PATENT DOCUMENTS

| | | | |
|---|---|---|---|
| 5,249,271 | 9/1993 | Hopkinson et al. | 395/877 |
| 5,513,326 | 4/1996 | Nute | 395/880 |
| 5,568,192 | 10/1996 | Hannah | 348/222 |
| 5,675,811 | 10/1997 | Broedner et al. | 395/750.05 |
| 5,734,373 | 3/1998 | Rosenberg et al. | 345/161 |
| 5,778,218 | 7/1998 | Gulick | 395/558 |
| 5,818,948 | 10/1998 | Gulick | 381/77 |
| 5,859,993 | 1/1999 | Synder | 395/384 |
| 5,860,119 | 1/1999 | Dicjser | 711/156 |

*Primary Examiner*—Christopher B. Shin
*Attorney, Agent, or Firm*—Conley, Rose & Tayon, PC; B. Noel Kivlin

[57] ABSTRACT

A computer system to optimize the flow of data and clock rate information to an isochronous bus is discussed. In one embodiment, a Universal Serial Bus (USB) host is coupled directly to a data producer or data consumer. The data received from the data producer is buffered by USB host 1504 prior to transmission to a USB function. The USB host additionally monitors the data level of the buffer within the USB host. The data level of the buffer within the USB host is indicative of the relative clock rates of the data producing device and the USB host. The USB host conveys a control signal to the data producer to increase or decrease the clock rate of the device based upon the level of data within the buffer of the USB host. In a similar manner, a data consumer is directly coupled to the USB host. The USB host stores data from a USB function and outputs the data to the data consumer at a rate determined by the data consumer. In an alternative embodiment, the data producer and the USB host are coupled via a data interface bus.

20 Claims, 5 Drawing Sheets

METHOD AND SYSTEM FOR OPTIMIZING THE FLOW OF ISOCHRONOUS DATA AND CLOCK RATE INFORMATION

BACKGROUND OF THE INVENTION

1. Field of the Invention

The present invention relates to data busses and particularly to optimizing control flow of isochronous data on data busses.

2. Description of the Related Art

The Universal Serial Bus (USB) specification is a proposed standard for an isochronous bus recently promulgated by a group of computer companies including Compaq Computer Corporation, Digital Equipment Corporation, IBM Corporation, Intel Corporation, Microsoft Corporation and Northern Telecom. Described below are various aspects of the Universal Serial Bus. Further background concerning the Universal Serial Bus may be obtained from the Universal Serial Bus Specification, which is hereby incorporated by reference.

The Universal Serial Bus is intended as a bi-directional, isochronous, low-cost, dynamically attachable, serial interface to promote easy PC peripheral expansion and provide full support for real-time voice, audio, and compressed video data. The Universal Serial Bus provides two-wire point-to-point signaling in which the signals are differentially driven at a bit rate of 12 megabits per second. The Universal Serial Bus includes support for both isochronous and asynchronous messaging at the 12 megabit per second data speed.

The Universal Serial Bus specification defines a Universal Serial Bus system in terms of Universal Serial Bus "interconnects", "devices", and "hosts". A Universal Serial Bus interconnect defines the manner in which devices are connected to and communicate with the host, including bus topology, data flow models, scheduling, and interlayer relationships. In any given Universal Serial Bus topology, there is only one host.

Universal Serial Bus devices include hubs and functions. Hubs provide additional attachment points to the Universal Serial Bus and may be integrated with a host, which ordinarily provides only one attachment point for connecting a hub or a function. Functions provide capabilities to the system, such as joystick, keyboard, microphone, and speaker capabilities.

Figure 1:
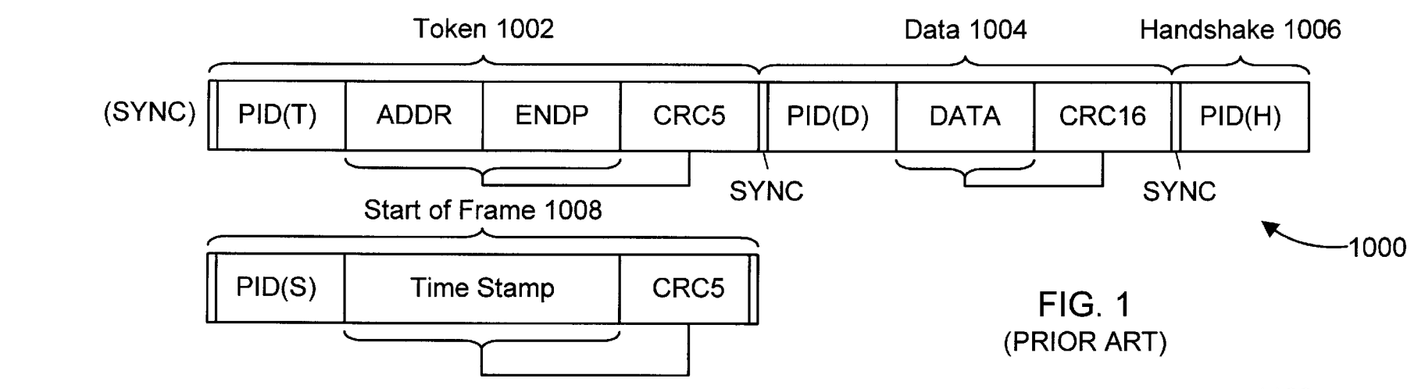
FIG. 1 is a representation of a data packet transfer along a Universal Serial Bus.

The basic data transfer protocol of the Universal Serial Bus is described as follows, with particular attention to FIG. 1. FIG. 1 is a diagram of the basic packet transfer 1000 of the Universal Serial Bus. The basic transfer 1000 includes a token packet 1002, a data packet 1004, and a handshake packet 1006. Each packet is preceded by a synchronization field SYNC which is used by input circuitry to align incoming data with the local clock. It is defined to be 8 bits in length and is stripped out by the connector interface.

Following the SYNC field in each packet is a packet identifier PID(T) for the token packet, PID(D) for the data packet, PID(H) for the handshake packet, and PID(S) for the start-of-frame packet, which may be considered a type of token packet). The packet identifiers PID(T), PID(D), PID (H) and PID(S) include a 4-bit identification field and a 4-bit check field used to identify the format of the packet and type. There are two types of token 1002 packet ID fields PID(T). These denote (i) a data transfer from the function to the host; and (ii) a data transfer from the host to the function. In addition to the packet ID, PID(T), the token packet includes an 8-bit address field ADDR and a 3-bit end point field, ENDP. The address field ADDR of the token packet specifies the function that it is to receive or send the data packet. The end-point field ENDP permits addressing of more than one subchannel of an individual function.

Only one type of start-of-frame packet identification field 1008, PID(S), is defined: a start of frame time stamp. The address and endpoint fields of the token packet are replaced in the start of frame packet with a time-stamp field. The time-stamp field for the start of frame packet provides a clock tick which is available to all devices on the bus. The start-of-frame packet is sent by the host every 1 ms ±0.01%. In addition, for both the token and start-of-frame packets, a 5-bit cyclical redundancy checksum (CRC) field is provided.

The data packet 1004 includes a packet identifier PID(D), a data field DATA, and a 16-bit cyclical redundancy checksum field, CRC16. Two types of packet IDs for the data field, data 0 and data 1, identify whether the data packet is being sent for the first time or whether being sent as a retry. The data field DATA may vary in length from 0 to N bytes. Failure of the cyclical redundancy checksum on the data field DATA causes the receiver to issue an error ERR handshake.

The handshake packet 1006 includes only a packet identifier PID(H), of which there are four types. An acknowledge handshake, ACK, indicates that the receiver will accept the data and that the CRC has succeeded. A negative acknowledge, NACK, indicates that the receiver cannot accept the data or that the source cannot send the data. An ERR field indicates that the receiver will accept the data, but that the CRC has failed. A stall handshake packet, STALL, indicates that the transmission or reception pipe is stalled. A stall handshake is defined only for stream-oriented end-points (as distinguished from message-oriented endpoints, discussed below).

Data flow on the Universal Serial Bus is defined in terms of "pipes." A pipe is a connection between a host and an endpoint. The Universal Serial Bus defines "stream" and "message" pipes. For a stream pipe, data is delivered in prenegotiated packet sizes. Data flows in at one end of the stream pipe and out the other end in the same order. Stream mode thus includes flow control and employs no defined USB structure. For a message pipe, however, a request is first sent to the device which is followed at some later time by a response from the end-point. Message pipes thus impose a structure on the data flow, which allows commands to be communicated. These commands can include bandwidth allocation.

The Universal Serial Bus supports isochronous, asynchronous, and asynchronous interactive data flow. For isochronous data, access to USB bandwidth is guaranteed. A constant data rate through the pipe is provided, and in the case of delivery failure due to error, there is no attempt to retry to deliver the data. Asynchronous interactive data flow provides a guaranteed service rate for the pipe, and the retry of failed transfer attempts. Asynchronous data flow accommodates access to the USB on a band-width available basis and also permits retry of data transfers.

Figure 2:
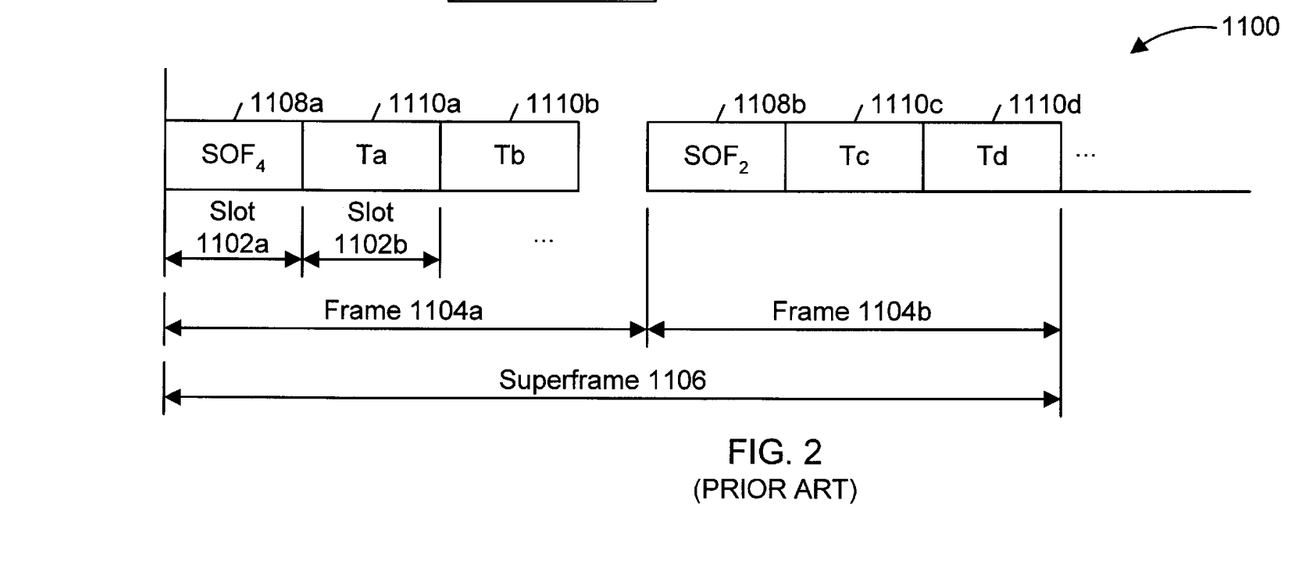
FIG. 2 is a representation of a scheduling paradigm for the Universal Serial Bus.

Scheduling of the Universal Serial Bus is defined in terms of "slots", "frames" and "super frames", as illustrated in FIG. 2, which shows an exemplary USB schedule 1100. Frames 1104b and 1104a begin with a start of frame packet, 1108a and 1108b, respectively. Each frame has a duration of time equal to about 1 ms. Each frame, 1104a, 1104b is subdivided into one or more slots, 1102a, 1102b, for example. Each slot corresponds to some USB transaction, e.g., 1110a, 1110b, 11110c, 11110d. Each slot is large enough to contain the worst case transmission time of the transaction to which it corresponds, and includes the effects of bit-stuffing, propagation delay through cables and hubs, response delays, and clocking differences between the host and the end-point. A super frame 1106 consists of a repeatable sequence of individual frames, and is the largest schedulable portion of time permitted.

The Universal Serial Bus provides both periodic service and aperiodic service. For periodic service corresponding to isochronous data, a fixed period exists between the delivery of start of frame packets to a specific end-point. However, aperiodic service is characterized by a varying period between delivery of start of frame tokens for a given end-point. Periodic service is given a higher priority in scheduling than aperiodic service.

Figure 3:
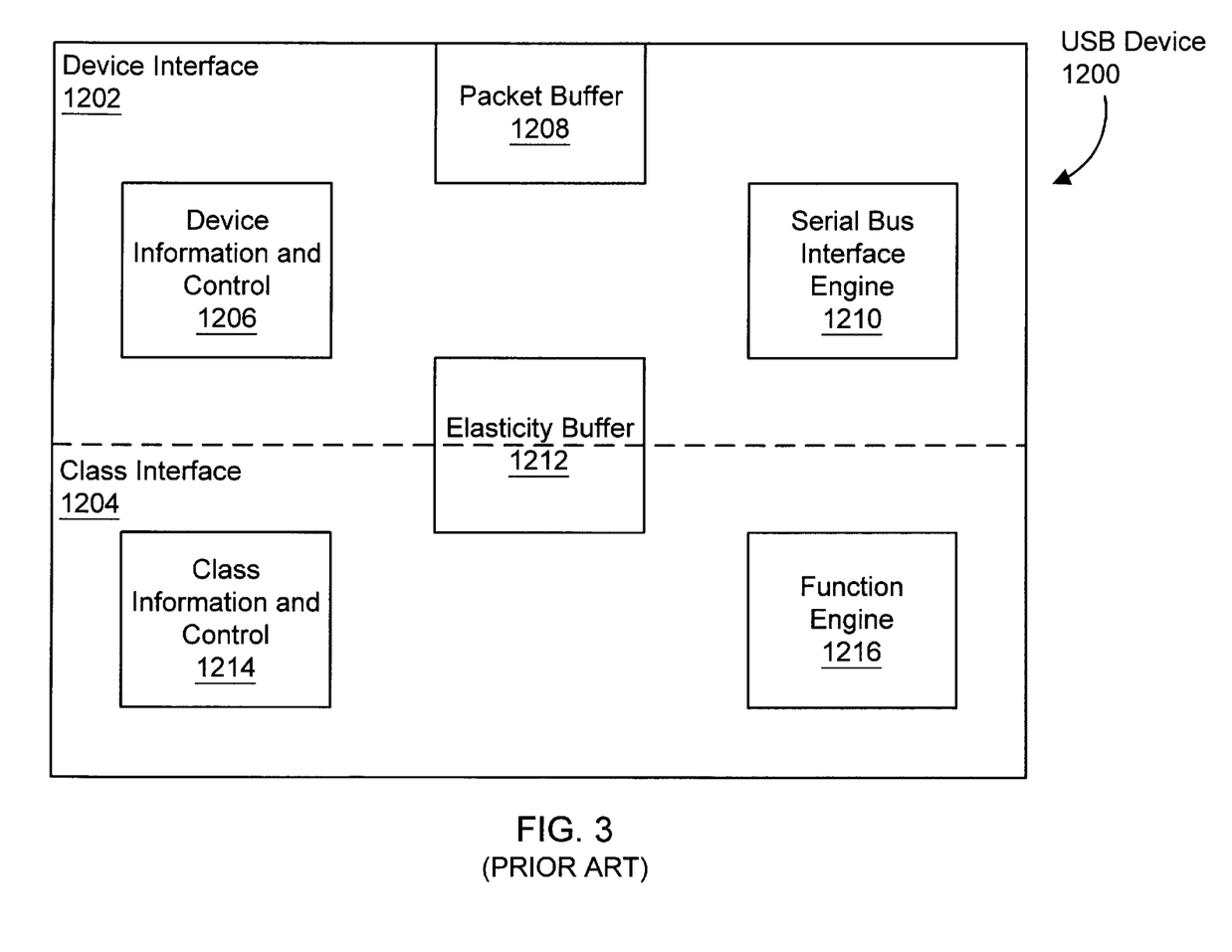
FIG. 3 is a block diagram of an exemplary Universal Serial Bus device.

Turning now to FIG. 3, there is illustrated an abstracted block diagram of a Universal Serial Bus device, such as a hub or function. Universal Serial Bus device 1200 includes a device interface 1202 and a class interface 1204. Device interface 1202 includes device information and control block 1206, which is required for the USB device to attach to the USB and is independent of the functionality provided by the device. The device interface further includes serial bus interface engine 1210, which provide for management of the bus interface, including performing acknowledgments and recognizing packets that are addressed to the USB device. In addition, the interface engine 1210 provides for stripping the SYNC field from incoming packets. The class interface 1204 includes class information and control block 1214 which depends upon the functionality of the device (for example, hubs and locators). Class interface 1204 further includes function engine 1216 which relates to the functionality implemented by the device. A USB device further includes logical buffers, such as packet buffer 1208 and elasticity buffer 1212. The packet buffer defines the maximum packet size which the USB device can receive or send. The elasticity buffer relates to how flexible the scheduled generator may be in allocating band-width for the associated end-point and determines the maximum amount of data the device end-point can handle. The various functional blocks of the USB device are not shown connected to one another in FIG. 3 because, as discussed in the USB specification, the relationship between the components may be implementation-dependent. In addition, a Universal Serial Bus device may include storage space, local to the USB device, though addressable by the host, and vendor space, which may be defined by the vendor of the device.

Figure 4:
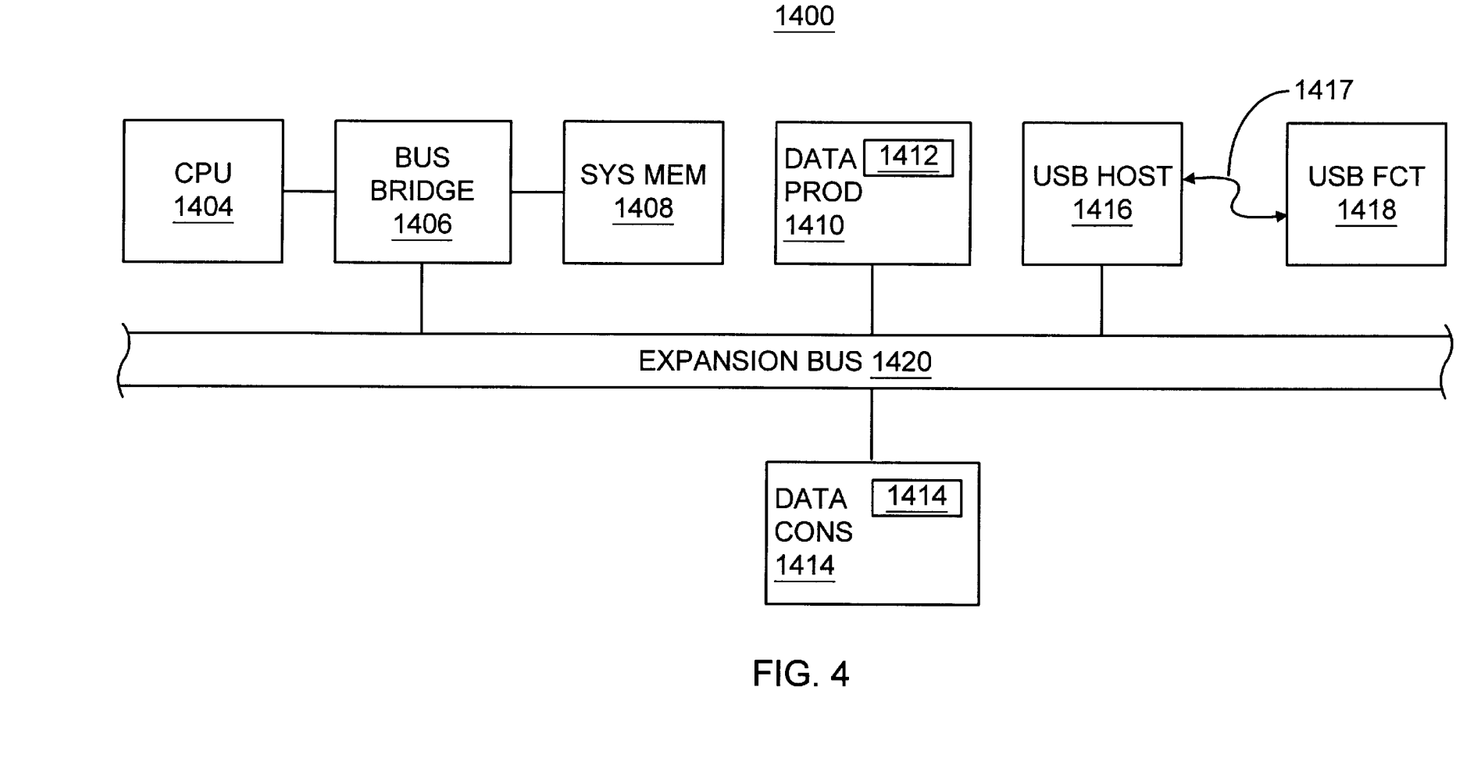
FIG. 4 is a block diagram of a computer system with a Universal Serial Bus device.

While the USB is intended to be an industry-wide standard peripheral interface, the USB specification does not define the relationship between the components in a computer system employing the USB. FIG. 4 is a block diagram illustrating the configuration of the computer system employing the USB according to one embodiment of the present invention. It is noted that the configuration of FIG. 4 is for illustrative purposes only. Computer system 1400 includes a system clock 1402, a CPU 1404, a bus bridge 1406, a system memory 1408, a data producer 1410, a data producer clock 1412, a data consumer 1414, a data consumer clock 1416, a USB host 1416, a USB interface 1417, a USB function 1418, and a PCI bus 1420. System clock 1402 is a conventional clock generation circuit which is coupled to CPU 1404. CPU 1404 is a conventional central processing unit such as a microprocessor including microprocessors implementing the x86 instruction set. System memory 1408 may be any conventional data storage device such as random access memory (RAM) or read only memory (ROM). Expansion bus 1420 may be any of a variety of types of expansion busses, including a peripheral component interconnect (PCI) bus, an industry standard architecture (ISA) bus, an extended industry standard architecture (EISA) bus, or a micro-channel architecture (MCA) bus. CPU 1404, system memory 1408 and expansion bus 1420 are coupled to bus bridge 1406. Bus bridge 1406 provides an interface between CPU 1404 and system memory 1408. Additionally, bus bridge 1406 provides an interface between expansion bus 1420 and system memory 1408.

A plurality of devices may interface to expansion bus 1420. In the illustrated embodiment, data producer 1410, data consumer 1414, USB host 1416 and bus bridge 1406 interface to expansion bus 1420. Expansion bus 1420 provides an interface for the exchange of data between the devices interfaced to the bus. For example, expansion bus 1420 provides an interface for data producer 1410 to convey data to system memory 1408 via bus bridge 1406. Data producer 1410 may be any conventional device for providing input data to computer system 1400. For example, data producer 1410 may be a digital signal processor for processing input data from a modem or another bus bridge that provides data to the computer system. In the illustrated embodiment, data producer 1410 includes a data producer clock 1412. In a similar manner, data consumer 1414 may be any conventional device that receives output data from computer system 1400. For example, data consumer 1414 may be a video graphics card for outputting video data. In the illustrated embodiment, data consumer 1414 includes data consumer clock 1416.

In the illustrated embodiment, USB host 1416 interfaces to computer system 1400 via expansion bus 1420. In an alternative embodiment, USB host 1416 may be integrated into bus bridge 1406. USB host 1416 provides an interface between computer system 1400 and USB interface 1417. In the illustrated embodiment, data desired to be output on USB interface 1417 to USB function 1418 is conveyed to USB host 1416 via expansion bus 1420. USB function 1418 may be any conventional device to provide capabilities to computer system 1400, such as a joystick, a keyboard, a microphone, or a speaker. The transferred data between data producer 1410 and USB host 1416 or between USB host 1416 and data consumer 1414 is typically a two step process. Data output from data producer 1410 is first stored in system memory 1408. The data from data producer 1410 may be stored in one or more dual port first-in/first-out (FIFO) RAM arrays, or stored in a predetermined portion of the main memory. The data is then transferred from system memory 1408 to USB host 1416 via expansion bus 1420. The data received by USB host 1416 is output to USB function 1418 via USB interface 1417.

System memory 1408 functions as a buffer for storing data produced by data producer 1410. For example, the data output by data producer 1410 may be data received at a constant periodic rate while USB host 1416 outputs blocks of data at a different rate. Accordingly, system memory 1408 stores the data received from data producer 1410 so that the data is available when USB host 1416 needs a block of data. In a similar manner, data from USB host 1416 stores data in system memory 1408 and data consumer 1414 reads that data from system memory 1408.

At least three problems arise from buffering data in system memory 1408. First, the transfer of data on expansion bus 1420 creates indeterminate delays. This problem is compounded because data is transferred twice on expansion bus 1420. Second, the transfer of data between data producer 1410 and/or data consumer 1414 and USB host 1416 creates overhead on expansion bus 1420. This problem is likewise compounded by the dual transfer of data over expansion bus 1420. Lastly, buffering data in system memory 1408 increases the loading on the system memory bandwidth.

Still further, buffering data in system memory 1408 makes it complicated to adjust the data rate of the data producer 1410 or data consumer 1414 to match the data needs of USB function 1418. To prevent a buffer within system memory 1418 from overflowing, it is necessary to adjust the data output rate of data producer 1410 to closely match the rate at which USB host 1416 outputs data to USB function 1418. If the data rate of data producer 1410 exceeds the rate at which USB host 1416 is output to USB function 1418, the buffers within system memory 1408 may overflow. Similarly, if the data output rate of data producer 1410 is too slow, a block of data to transfer to USB function 1418 via USB host 1416 may not be available, which will starve USB function 1418. Accordingly, data producer clock 1412 and data consumer clock 1416 must be adjusted to substantially track the clock rate of USB function 1418. Unfortunately, the data buffers are in system memory 1418 which complicates monitoring the level of data within the buffers in order to determine and adjust the relative rates of the clocks.

SUMMARY OF THE INVENTION

The problems outlined above are in large part solved by a method and apparatus for optimizing the control of isochronous data and clock rate information. According to one embodiment of the present invention, a USB host 1416 is directly connected to a data producer or data consumer. A data buffer is included in the USB host for storing data from the data producer or storing data for the data consumer. By bypassing system memory and adding the buffers to the USB host, the indeterminate delays of the expansion bus are eliminated and the overhead of transferring the data on the expansion bus is eliminated. Likewise, the bandwidth of the system memory is reduced. In an alternative embodiment, the data producer or data consumer communicates to the USB host via the expansion bus, but the data is buffered in the USB host rather than the system memory. In this embodiment, the indeterminate delays caused by the expansion bus and the overhead on the expansion bus are reduced because data is only transferred on the expansion bus one time.

The present invention also simplifies the clock control of the computer system. In one embodiment of the present invention, the data buffer resides in the USB host. Accordingly, the USB host may monitor the data levels within the buffer to determine the relate rates of the clocks.

Broadly speaking, the present invention contemplates a Universal Serial Bus (USB) data transfer system including a data producer, a USB host and a USB function. The data producer is configured to output a stream of data for transfer via the USB. The USB host is coupled to the data producer, wherein the USB host includes a buffer configured to store the data output by the data producer. The USB function is coupled to the USB host. The USB host conveys the data stored in the buffer to the USB function via a USB interface coupled between the USB host and the USB function.

The present invention further contemplates, a Universal Serial Bus (USB) data transfer system including a USB function, a USB host and a data consumer. The USB function is configured to output a stream of data. The USB host is coupled to USB function and includes a buffer configured to store the data output by the USB function. The data consumer is coupled to the USB host and configured to receive the data stored in the buffer. The USB host receives the data from the USB function via a USB interface coupled between the USB host and the USB function.

The present invention still further contemplates a method for transferring data on a USB comprising the steps of: producing data for transfer via a USB; storing the data to in data buffer of a USB host; conveying the data stored in the data buffer to a USB function via a USB interface; monitoring a level of the data in the data buffer; providing a signal to a device indicative of a level of the data in the data buffer; and adjusting a clock rate of the device in response to the signal indicative of the level of data in the buffer.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Figure 5:
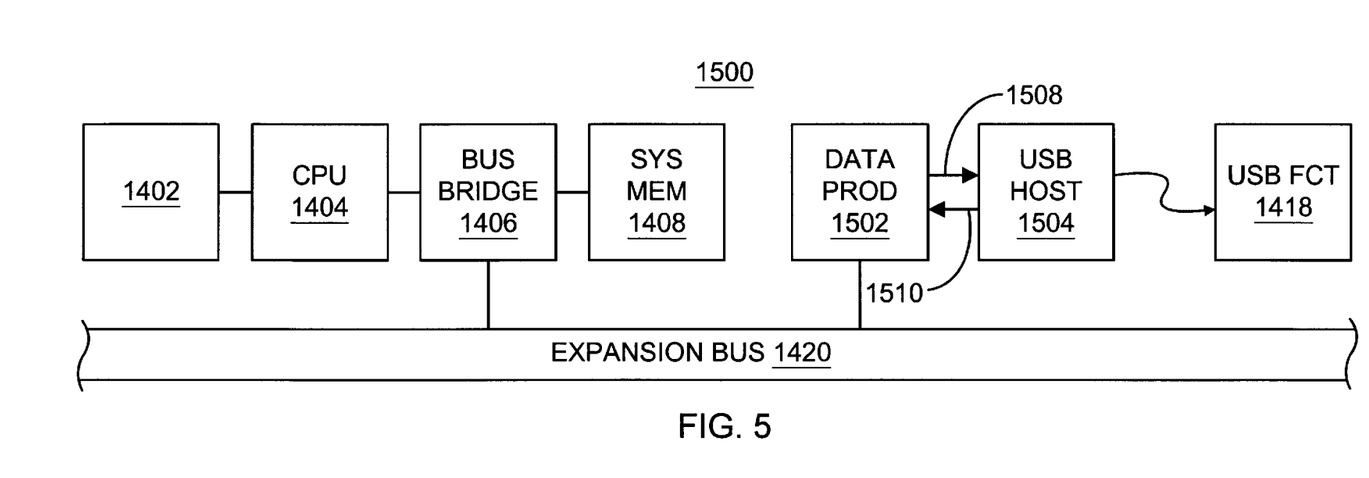
FIG. 5 is a block diagram of an improved computer system with a Universal Serial Bus device according to one embodiment of the present invention.

Turning now to FIG. 5, a block diagram of an improved computer system with a Universal Serial Bus device according to one embodiment of the present invention is shown. Elements which are similar or identical to those in FIG. 4 have the same reference numeral for convenience. Computer system 1500 includes system clock 1402, CPU 1404, bus bridge 1406, system memory 1408, USB function 1418 and expansion bus 1420. Computer system 1500 further includes data producer 1502 and USB host 1504. In the illustrated embodiment, data producer 1502 is coupled to expansion bus 1420 and USB host 1504. Data to be transferred from data producer 1502 to USB function 1418 is transferred directly from data producer 1502 to USB host 1504. USB host 1504 includes a buffer for storing data received from data producer 1502. In one embodiment, data is not buffered in data producer 1502. In this embodiment, data from data producer 1502 is conveyed to USB host 1504 as the data is produced. The data received by USB host 1504 from data producer 1502 is stored in a data buffer. The data buffer stores the data produced by data producer 1502 until USB host 1504 conveys the data to USB function 1418. In one embodiment, USB host 1504 downloads a block of data to USB function 1418 once every millisecond. In this embodiment, USB host 1504 stores the data received from data producer 1502 in a data buffer and downloads one block of data each millisecond. In one embodiment, USB host 1504 includes two buffers. One buffer receives data from data producer 1502 while the other buffer outputs data to USB function 1418. When the buffer receiving data is full, the buffers are switched.

The transfer of data between data producer 1502 and USB host 1504 may be via one data line or a plurality of data lines. If one data line is used to transfer data between data producer 1502 and USB host 1504, the transmission of data is referred to as serial data transmission. Alternatively, if a plurality of data lines are used to transfer data between data producer 1502 and USB host 1504, the transmission is referred to as parallel data transmission. In either embodiment, USB host 1504 buffers the data received until the data is transferred to USB function 1418.

As discussed above, a difference in clock rate may exist between data producer 1502 and USB host 1504. Clock rate differences can create at least two different problems. If the clock rate of data producer 1502 is significantly greater than the clock rate of USB host 1504, i.e. the data producer leads the host, the buffer within USB host 1504 will fill-up and eventually overflow. Conversely, if the clock rate of data producer 1502 lags the clock rate of USB host 1504, the buffer will empty and USB host 1504 will be starved, i.e. there will be insufficient data in the buffer. Starving the host, at a minimum, makes inefficient use of the bus bandwidth, or worse, fails to provide a sufficient amount of data to USB function 1418. A mechanism is provided to adjust the clock rate of data producer 1502 to substantially match the data rate of USB host 1504. It is noted, that the clock rate of data producer 1502 is adjusted because it is not practical to adjust the data rate of USB host 1504. Although in the illustrated embodiment, only one data producer and no data consumers are coupled to USB host 1504. In other embodiments, multiple data producers and/or data consumers may be coupled to USB host 1504. Accordingly, each device could not adjust the clock rate of USB host 1504 to match that device. Instead, the clock rate of each data producer or data consumer is adjusted to match the clock rate of the USB host. A clock lead/lag signal is conveyed from USB host 1504 to data producer 1502 via a clock lead/lag conductor 1510. The clock lead/lag signal indicates to data producer 1502 whether to speed up or slow down the clock rate of data producer 1502.

To determine the relative clock rates of data producer 1502 and USB host 1504, USB host 1504 monitors the level of fullness or emptiness of the buffer that receives data from data producer 1502. Because USB host 1504 outputs blocks of data to USB function 1418, the monitoring of the level of the data buffer may occur at the same time relative to the transmission of a data block. In a preferred embodiment, the level of the data buffer is monitored just prior to downloading a block of data from the buffer or just after downloading a block of data from the buffer. If the buffer is fuller than expected, the data lead/lag signal causes data producer 1502 to decrease its clock rate. Conversely, if the buffer is less full than expected, the clock lead/lag signal causes data producer 1502 to increase its clock rate.

Although computer system 1500 only illustrates one data producer and no data consumers, the present invention contemplates a device that includes a plurality of data producers and a plurality of data consumers. Communication between other data producers and USB host 1504 is conducted in a similar manner to that discussed above for communication between data producer 1502 and USB host 1504. Communication between a data consumer and USB host 1504 is analogous to the discussion above related to data producer 1502. A data consumer receives data from USB host 1504 rather than transmitting data to USB host 1504. USB 1504 buffers the data received from USB function 1418 and transmits the data to the data consumer.

Computer system 1500 advantageously enables the transfer of data from a data producer or to a data consumer to/from a USB host without introducing indeterminate delays due to an expansion bus such as a PCI bus. Further, computer system 1500 does not create overhead on the expansion bus or increase the loading of the system memory bandwidth.

Computer system 1500 is a preferred embodiment when data producer 1502 (and/or a data consumer) and USB host 1504 reside on the same integrated circuit. Alternatively, computer system 1500 is a preferred embodiment if data producer 1502 (and/or a data consumer) and USB host 1504 are on separate integrated circuits with dedicated pins.

Figure 6:
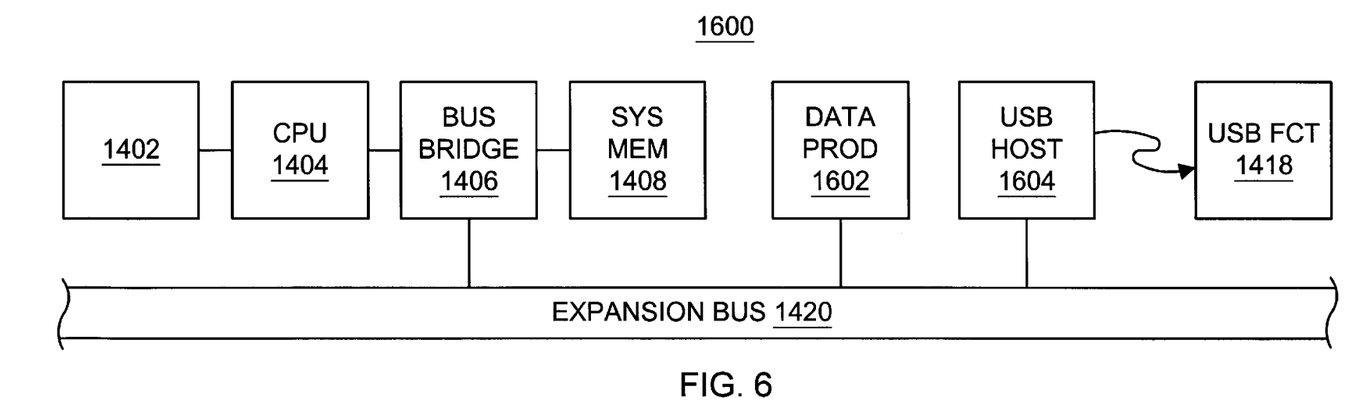
FIG. 6 is a block diagram of another embodiment of an improved computer system with a Universal Serial Bus device according to the present invention.

Turning now to FIG. 6, an alternative embodiment of a computer system for transferring data from a data producer to a USB function is shown. Elements similar or identical to those in FIGS. 4 and 5 have the same reference number for convenience. Computer system 1600 includes system clock 1402, CPU 1404, bus bridge 1406, system memory 1408 and USB function 1418. Additionally, computer system 1600 includes data producer 1602 coupled to expansion bus 1420 and USB host 1604 coupled to expansion bus 1420. In computer system 1600, data producer 1602 transfers data to USB host 1604 via expansion bus 1420. In the illustrated embodiment, data producer 1602 passes the data directly to USB host 1604. In other words, data producer 1602 uses peer-to-peer communication over expansion bus 1420 to USB host 1604. The data received from data producer 1602 is buffered in USB host 1604 prior to transmission to USB function 1418.

In one embodiment, data producer 1602 includes a relatively small buffer for buffering data before transferring the data to USB host 1604. In one particular embodiment, data is transferred from data producer 1602 to USB host 1604 in four doubleword (i.e. 64-bit word) blocks. USB host 1604 stores the data blocks received by data producer 1602 until the data is transferred to USB function 1418.

USB host 1604 conveys a clock lead/lag indication to data producer 1602 via expansion bus 1420. In one embodiment, the adjusting of the clock rate is accomplished by periodic writes to a register within data producer 1602. Data producer 1602 periodically reads the register to determine what if any adjustments to make to the clock rate. Because USB host 1604 receives data in data blocks and outputs data in data blocks, the monitoring of the level of the buffer should occur at the same time relative to the receipt of input data and the transmission of output data.

Computer system 1600 is the preferable embodiment when data producer 1602 (and/or a data consumer) and USB host 1604 reside on separate integrated circuits and do not have dedicated pins for the transmission or reception of data.

Although computer system 1600 only illustrates one data producer and no data consumers, the present invention contemplates a device that includes a plurality of data producers and a plurality of data consumers. Communication between other data producers and USB host 1604 is conducted in a similar manner to that discussed above for communication between data producer 1602 and USB host 1604. Communication to a data consumer is analogous to the discussion above related to a data producer 1602. A data consumer, however, receives data from USB host 1604 rather than transmitting data to USB host 1604. USB host 1604 either transmits data messages to the data consumer periodically or responds to a request for data from the data consuming device on expansion bus 1420.

Figure 7:
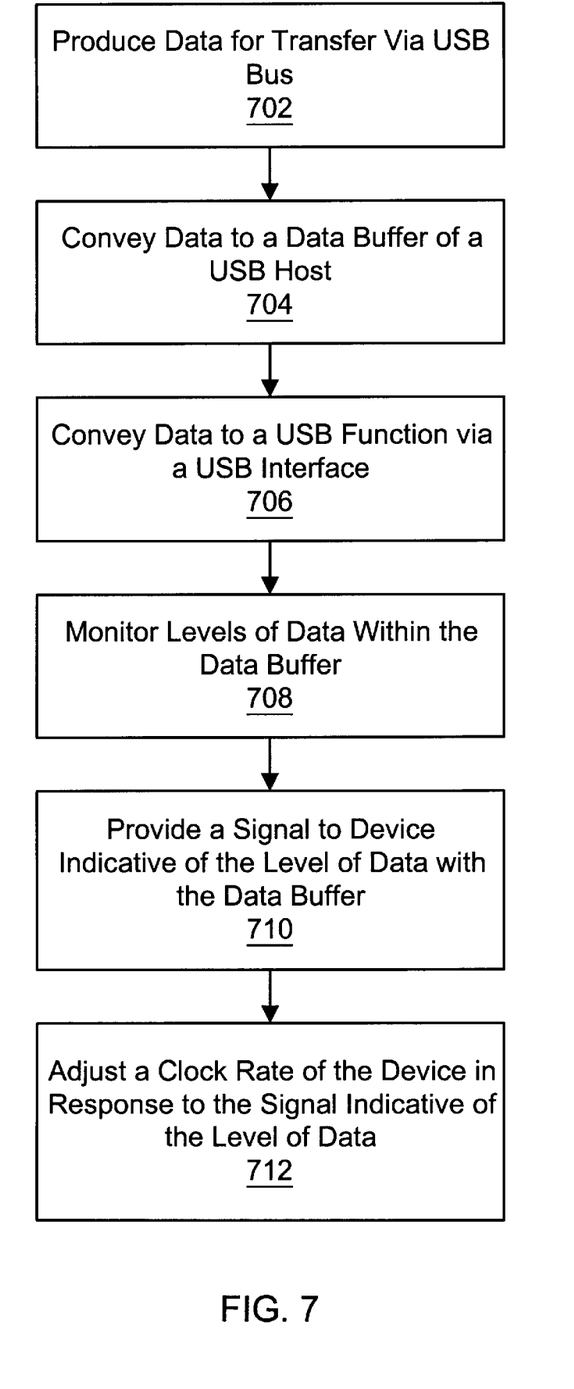
FIG. 7 is a flow chart diagram illustrating an optimized flow of data and clock rate adjustment according to one embodiment of the present invention.

Turning now to FIG. 7, a flow chart illustrating a method for optimizing the flow of data and clock rate information is shown. In step 702, data is produced by a data producer for transfer via a USB bus. In step 704, the data produced by the data producer in step 702 is conveyed to a data buffer within a USB host. In step 706, the data is conveyed from the USB host to a USB function via a USB interface. In step 708, a level of the data buffer within the USB host is monitored. In step 710, the USB host provides a signal to the data producer indicative of the level of data in the buffer. In step 712, the data producer adjusts its clock rate in response to the signal indicative of the level of data in the buffer. In one embodiment, if the signal indicates that the buffer is fuller than expected, the data producer reduces the clock rate. Conversely, if the signal indicates that the level of data in the buffer is less than expected, the data producer increases the clock rate.

Numerous variations and modifications will become apparent to those skilled in the art once the above disclosure is fully appreciated. It is intended that the following claims be interpreted to embrace all such variations and modifications.

What is claimed is:

1. A Universal Serial Bus (USB) data transfer system comprising:
   a data producer configured to output a stream of data for transfer via said USB;
   a USB host coupled to said data producer, wherein said USB host includes a buffer configured to store said data output by said data producer; and
   a USB function coupled to said USB host;
   wherein said USB host conveys said data stored in said buffer to said USB function via a USB interface coupled between said USB host and said USB function.

2. The USB data transfer system of claim 1 wherein said USB host outputs a clock synchronization signal to said data producer, and said clock synchronization signal causes said data producer to adjust a rate of outputting said data to said USB host.

3. The USB data transfer system of claim 2 wherein said data producer outputs said data to said USB host as said data is produced.

4. The USB data transfer system of claim 3 wherein said data producer is configured to serially convey said data to said USB host.

5. The USB data transfer system of claim 1 wherein said data producer and said USB host are coupled to a data transfer bus, wherein said data producer is configured to transfer said data to said USB host via said data transfer bus.

6. The USB data transfer system of claim 5 wherein said data transfer bus is a Peripheral Communication Interface (PCI) bus.

7. The USB data transfer system of claim 1 wherein said USB host is configured to convey data to said USB function in blocks of data of a predetermined size.

8. The USB data transfer system of claim 7 wherein said buffer of said USB host is configured to store a plurality of said blocks of data.

9. A Universal Serial Bus (USB) data transfer system comprising:
   a USB function configured to output a stream of data;
   a USB host coupled to USB function, wherein said USB host includes a buffer configured to store said data output by said USB function; and
   a data consumer coupled to said USB host and configured to receive said data stored in said buffer;
   wherein said USB host receives said data from said USB function via a USB interface coupled between said USB host and said USB function.

10. The USB data transfer system of claim 9 wherein said USB host outputs a clock synchronization signal to said data consumer, and said clock synchronization signal causes said data consumer to adjust a rate of inputting said data from said USB host.

11. The USB data transfer system of claim 10 wherein said data consumer is configured to serially receive said data from said USB host.

12. The USB data transfer system of claim 11 wherein said data consumer and said USB host are coupled to a data transfer bus, wherein said data consumer is configured to receive said data from said USB host via said data transfer bus.

13. The USB data transfer system of claim 12 wherein said data transfer bus is a Peripheral Component Interconnect (PCI) bus.

14. The USB data transfer system of claim 9 wherein said USB host is configured to receive data from said USB function in blocks of data of a predetermined size.

15. The USB data transfer system of claim 14 wherein said buffer of said USB host is configured to store a plurality of said blocks of data.

16. A method for transferring data on a USB comprising the steps of:
   producing data for transfer via a USB;
   storing said data in a data buffer of a USB host;
   conveying said data stored in said data buffer to a USB function via a USB interface;
   monitoring a level of said data in said data buffer;
   providing a signal to a device indicative of a level of said data in said data buffer; and
   adjusting a clock rate of said device in response to said signal indicative of said level of data in said buffer.

17. The method for transferring data on a USB wherein said device is a data producer configured to output data to said USB host.

18. The method for transferring data on a USB of claim 16 wherein said device is a data consumer configured to receive data from said USB host.

19. The method for transferring data on a USB of claim 16 wherein said device is directly coupled to said USB host.

20. The method for transferring data on a USB of claim 16 wherein a data transfer bus is coupled between said device and said USB host.

* * * * *